(12) United States Patent
Sharma et al.

(10) Patent No.: US 9,466,307 B1
(45) Date of Patent: Oct. 11, 2016

(54) ROBUST SPECTRAL ENCODING AND DECODING METHODS

(75) Inventors: Ravi K. Sharma, Hillsboro, OR (US); Adnan M. Alattar, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 2478 days.

(21) Appl. No.: 12/125,840

(22) Filed: May 22, 2008

Related U.S. Application Data

(60) Provisional application No. 60/939,580, filed on May 22, 2007.

(51) Int. Cl.
| | |
|---|---|
| G10L 21/00 | (2013.01) |
| G10L 19/12 | (2013.01) |
| G10L 15/08 | (2006.01) |
| G10L 25/00 | (2013.01) |
| G10L 19/00 | (2013.01) |
| G10L 15/00 | (2013.01) |
| H04N 7/167 | (2011.01) |
| G06K 9/00 | (2006.01) |

(52) U.S. Cl.
CPC ............... *G10L 19/12* (2013.01); *G10L 15/08* (2013.01)

(58) Field of Classification Search
USPC ............ 704/500, 200, 200.1, 219, 201; 382/100; 380/210
See application file for complete search history.

(56) References Cited

U.S. PATENT DOCUMENTS

| | | | | |
|---|---|---|---|---|
| 5,497,435 A * | 3/1996 | Berger | ........................... | 382/249 |
| 5,956,674 A * | 9/1999 | Smyth | ................. | G10L 19/0208 704/200.1 |
| 6,061,793 A * | 5/2000 | Tewfik et al. | ................. | 713/176 |
| 6,272,176 B1 | 8/2001 | Srinivasan | | |
| 6,424,725 B1 | 7/2002 | Rhoads et al. | | |
| 6,483,927 B2 * | 11/2002 | Brunk et al. | ................. | 382/100 |
| 6,614,914 B1 | 9/2003 | Rhoads et al. | | |
| 6,785,353 B1 * | 8/2004 | Zakrzewski | ................. | 375/357 |
| 6,904,151 B2 * | 6/2005 | Deguillaume et al. | ........ | 382/100 |
| 6,968,564 B1 | 11/2005 | Srinivasan | | |
| 6,988,202 B1 | 1/2006 | Rhoads et al. | | |
| 7,006,555 B1 | 2/2006 | Srinivasan | | |
| 7,058,570 B1 * | 6/2006 | Yu | ........................ | G10L 19/018 704/219 |
| 7,076,082 B2 * | 7/2006 | Sharma | ........................ | 382/100 |
| 7,095,811 B1 * | 8/2006 | Shikh-Bahaei et al. | ...... | 375/340 |
| 7,272,556 B1 * | 9/2007 | Aguilar | ................. | G10L 19/093 704/201 |
| 7,298,841 B2 * | 11/2007 | Sewell | ................... | G06T 1/0028 380/210 |
| 7,454,033 B2 * | 11/2008 | Stach et al. | ................... | 382/100 |
| 7,610,205 B2 * | 10/2009 | Crockett | ................. | G10L 21/04 704/200.1 |
| 7,657,102 B2 * | 2/2010 | Jojic et al. | ..................... | 382/224 |
| 7,769,202 B2 * | 8/2010 | Bradley et al. | ............... | 382/100 |

(Continued)

OTHER PUBLICATIONS

Feature Matching and Signal Recognition Using Wavelet Analysis by Robert J. Barsanti, Edwin Spencer, James Cares and Lucas Parobek, Department of Electrical and Computer Engineering, The Citadel, Charleston, SC as published in Proceedings of the 38th Southeastern Symposium on System Theory, Tennessee Technological University, Cookeville, TN, USA, M.*

*Primary Examiner* — Pierre-Louis Desir
*Assistant Examiner* — Neeraj Sharma
(74) *Attorney, Agent, or Firm* — Digimarc Corporation

(57) ABSTRACT

Spectral encoding methods are more robust when used with improved weak signal detection and synchronizations methods. Further robustness gains are achieved by using informed embedding, error correction and embedding protocols that enable signal to noise enhancements by folding and pre-filtering the received signal.

7 Claims, 2 Drawing Sheets

(56) References Cited

U.S. PATENT DOCUMENTS

| | | | |
|---|---|---|---|
| 7,809,154 B2* | 10/2010 | Lienhart et al. | 382/100 |
| 8,023,525 B2* | 9/2011 | Oh et al. | 370/432 |
| 8,331,497 B2* | 12/2012 | Alagha et al. | 375/332 |
| 2001/0047256 A1* | 11/2001 | Tsurushima et al. | 704/200 |
| 2005/0055214 A1* | 3/2005 | Kirovski et al. | 704/273 |
| 2005/0177332 A1* | 8/2005 | Lemma et al. | 702/106 |
| 2005/0177361 A1 | 8/2005 | Srinivasan | |
| 2008/0114606 A1* | 5/2008 | Ojala et al. | 704/500 |

* cited by examiner

ROBUST SPECTRAL ENCODING AND DECODING METHODS

RELATED APPLICATION DATA

This application claims benefit of Provisional Application No. 60/939,580, filed May 22, 2007, which is incorporated herein by reference.

TECHNICAL FIELD

The invention relates to signal processing, and specifically, media signal processing for encoding and decoding auxiliary data.

BACKGROUND AND SUMMARY

U.S. Pat. Nos. 7,006,555, 6,968,564, and 6,272,176 and U.S. Patent Publication 2005-0177361, which are hereby incorporated by reference, disclose methods of encoding and decoding inaudible auxiliary data in audio signals. These techniques have been used to encode data in the audio portion of TV programs for broadcast monitoring and audience measurement. In these applications, the inaudible codes must be recoverable from the audio signal despite distortions of the audio signal incurred during the broadcast of the programs. These distortions may include digital to analog (D/A) and analog to digital (A/D) conversions (and associated sampling operations) as well as lossy compression. While the methods have been developed to enable reasonable recovery of the encoded auxiliary data, they are not sufficiently robust for applications in which the audio signal is subjected to greater distortions, such as repeated sampling operations (e.g., including re-sampling occurring in a series of D/A and A/D conversions), time scale changes, speed changes, successive compression/decompression operations (e.g., including transcoding into different compression formats). These additional distortions occur when the program content is captured at a receiver, re-formatted and uploaded to the Internet, such as the case when TV programs are uploaded to web sites. For example, the audio portion of the TV program is captured from an analog output, converted to digital (which includes re-sampling), compressed in a format compatible with the content hosting web site, uploaded, and then transcoded into a format for storage on the content distribution servers of the web site and suitable for streaming in response to requests from the web site visitors.

Such distortions tend to weaken the embedded inaudible code signal preventing its recovery. Further, they make it more difficult for the decoder to synchronize the reading of the inaudible code. The start codes included with the code signal are often insufficient, or not processed effectively, to enable the decoder to ascertain the location and time scale of the inaudible code signal in the received audio signal.

This document describes methods for making spectral encoding methods more robust. These methods include methods for decoding that address weak signal and/or synchronization issues caused by distortions to the encoded audio signal. These methods also include improvements to the encoding method and corresponding decoding methods that improve the robustness of the embedded data to distortion.

One aspect of the invention comprises a method of embedding data in a media signal, wherein the data is embedded in the media signal by adjusting signal values at frequencies selected from among set of frequency locations in predetermined frequency bands, the method comprising: using signal characteristics of the media signal to select a pattern of frequencies from among the set of frequency locations that satisfy a desired performance criteria for embedding data; and embedding the data at the selected pattern of frequencies by adjusting the signal values at the frequencies, wherein the selected pattern of frequencies varies according to the signal characteristics and the desired performance criteria.

Another aspect of the invention comprises a method of decoding data embedded in a media signal, wherein the data is embedded in the media signal by adjusting signal values at frequencies, the method comprising:

performing an initial approximation of time scale changes of the media signal using at least a portion of the embedded data in a first domain;

performing synchronization of the embedded data in a second domain, different from the first domain; and decoding the embedded data.

Another aspect of the invention comprises a method of decoding data embedded in a media signal, wherein the data is embedded in the media signal by adjusting signal values at frequencies, the method comprising:

performing a least squares method to detect embedded data at the frequencies; and using the results of the least squares method to decode the embedded data from the media signal.

Further features will become apparent with reference to the following detailed description and accompanying drawings.

DETAILED DESCRIPTION

The following embodiments improve the robustness of the spectral encoding and decoding methods of U.S. Pat. Nos. 7,006,555, 6,968,564, and 6,272,176 and U.S. Patent Publication 2005-0177361. A description of these methods is substantially covered in U.S. Pat. No. 7,006,555 ('555 patent) and 2005-0177361 ('361 publication). For the sake of illustration, the following embodiments are designed for the encoding and decoding methods of these patents that encode inaudible auxiliary codes by selectively increasing/decreasing the audio signal energy at a set of frequencies relative to the energy of neighboring frequencies. The basic signal processing improvements described for these embodiments can be adapted for alternative encoding and decoding schemes.

Decoder Improvements

Detector improvements enable accurate recovery of the auxiliary data in the inaudible code signal weakened through distortions or distorted in a manner (e.g., time scale changes) that undermines synchronization. One advantage to detector-only improvements is that it enables recovery from previously encoded audio without requiring changes to the encoder and re-encoding of the audio signal.

These detector improvements fall in two categories: synchronization methods and weak signal methods. These methods, which often overlap due to the similarities of the synchronization and data components of the inaudible code signal, are described below.

Figure 1:
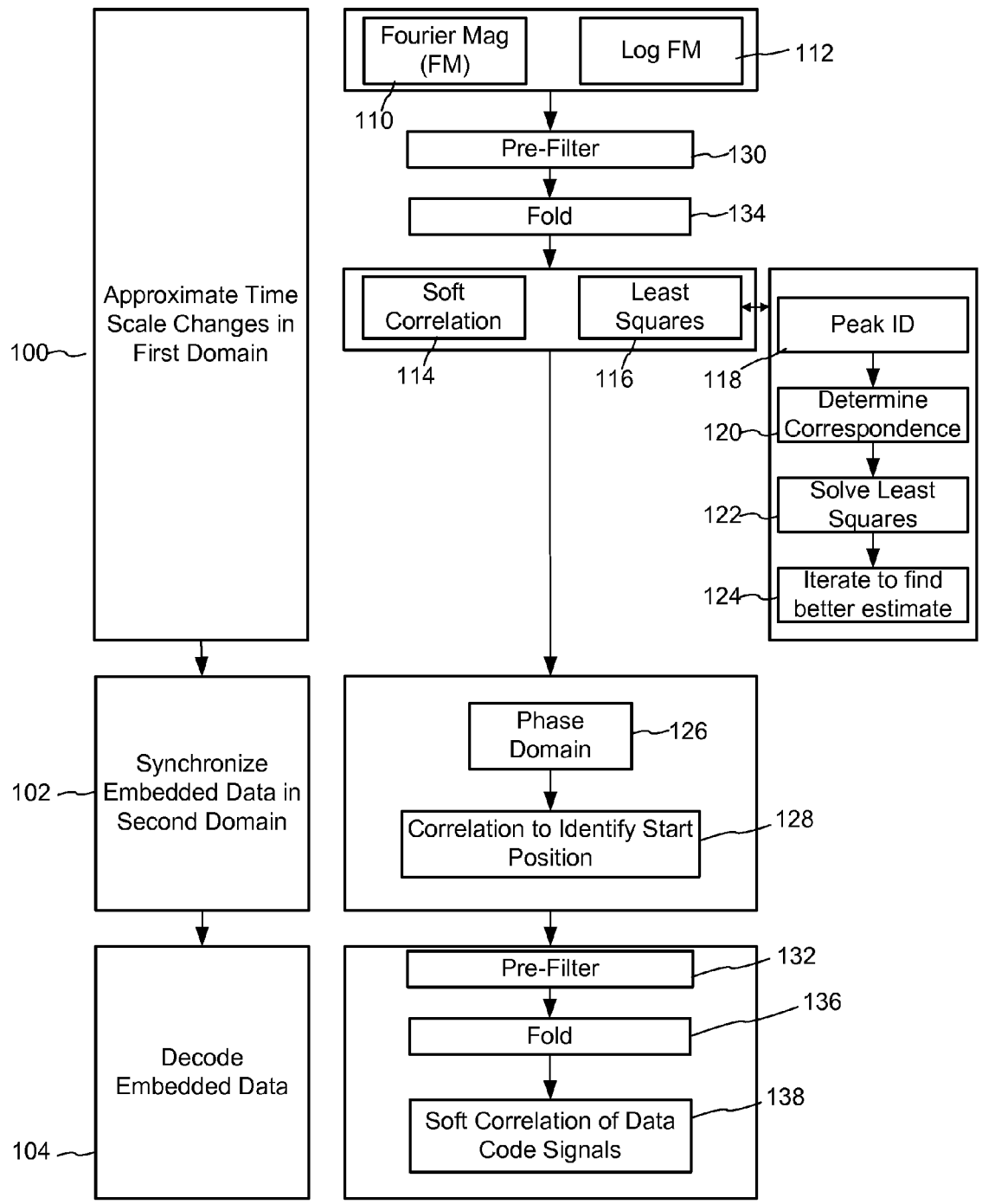
FIG. 1 is a diagram illustrating methods for decoding date embedded in media signal, including synchronization of embedded data and decoding auxiliary data.

As summarized above, one aspect of the invention comprises a method of decoding data embedded in a media signal, wherein the data is embedded in the media signal by adjusting signal values at frequencies. FIG. 1 is a diagram illustrating methods for decoding date embedded in a media signal. One decoding method comprises performing an initial approximation of time scale changes of the media signal using at least a portion of the embedded data in a first domain (as shown in block 100); performing synchronization of the embedded data in a second domain, different from the first domain (as shown in block 102); and decoding the embedded data (as shown in block (104). Further detail about alternative implementations of this signal processing is shown to the right of blocks 100-104 in FIG. 1 and described below. Also as summarized above, another aspect of the invention is a method of decoding data embedded in a media signal, wherein the data is embedded in the media signal by adjusting signal values at frequencies. This decoding method comprises performing a least squares method (116 and 118-124) to detect embedded data at the frequencies and using the results of the least squares method to decode the embedded data from the media signal (104, and 132-138). Block 116 depicts an example of where a least squares method may reside in the processing flow of a particular embedded data decoder, and blocks 118-124 show a specific example of performing a least squares method.

Re-sampling of the audio and time scale changes introduce distortions to the positions and time scale of the inaudible code relative to the original positions and times scale at the time of its encoding. This causes the location of the changes made to frequencies (e.g., the local maxima and minima) to encode elements of the code signal to shift.

One approach is to do a conversion of the Fourier magnitude data (110) to the log scale (112). To perform synchronization, this log conversion step is inserted into the method of the '361 publication after FFT of the received audio signal. This log conversion of the Fourier magnitude data removes time scale distortion due to re-sampling.

Further distortion (e.g., non-linear distortion) is measured and compensated for in additional detector refinement stages. One such stage correlates a synchronization and/or data signal pattern at the frequency locations of the pattern with the Fourier magnitude data in the log domain as described in U.S. Pat. No. 6,424,725, which is hereby incorporated by reference.

Preferably, the correlator applies a "soft" correlation of the 5 frequency locations of the synch signal in the method of the '361 publication (114). The same applies for three bit data codes in each of the data blocks described in the '361 publication (138).

Another approach is to use a least squares optimization method (116) to compute the time scale changes between the original embedded code signal and the received embedded code signal. These time scale changes are approximated by an affine transform. Generally speaking, an affine (strictly, linear) mapping in the frequency domain is fully defined by 2 points. Knowing the original locations of 2 points, and their transformed locations, one can derive the linear mapping (e.g., there are 4 equations, 4 unknowns). In this approach, the decoder uses "Least Squares" estimation for obtaining the solution. This gives a maximum likelihood estimate if errors (in code signal frequency locations) are independently and normally distributed. One embodiment of the method is:

1. Peak identification—identify peaks (potential code signal frequency locations) in Fourier magnitude domain for given signal (118)
2. Correspondence determination—determine which peak (transformed code signal frequency location) corresponds to which code signal element (120)
3. Least squares solution—calculate affine transform using least squares—requires the location of the original code signal frequencies and the transformed code signal frequencies. (122)
4. Iteration—use the solution in Step 3 as a starting point to find a better estimate if required (124)

All decoding (both of synchronization and variable code data) is preferably performed in the log domain (112) so that re-sampling and other time scale errors are reduced or eliminated.

Alternatively, after time scale distortions are approximated, further synchronization and data signal extraction can be performed in other domains. For example, one embodiment uses the phase (126) of the encoded signal (e.g., correlates the phase of the original encoded signal with the received signal (128)) to identify the start location more accurately.

Another enhancement is to capture a sufficiently long block of audio such that multiple instances of the synchronization data are included in the captured block. The detector then detects the code signal using a match filtering and/or least squares approximation over a longer window (e.g., one in which multiple sync blocks are included). For example, in the '361 publication, sync blocks occur about every 3 seconds in the original audio. Multiple sync blocks can be used together to form the above mentioned synchronization pattern, which is then detected using the above improvements.

A related improvement is to retain received data for further decoding analysis, even if a first pass decoding does not yield an accurate data recovery. In particular, the decoder retains decoding results and Fourier magnitude data of candidate synch block information, even if the next block yields no code data at first. The current approach discards the current synch if the next block yields no data. In contrast, this improvement enables the detector to accumulate evidence of a code signal, and then go back to the previous block if subsequent detection results indicate that the inaudible code signal is likely present.

Another improvement is to pre-filter the Fourier magnitude data to sharpen the peaks of the sync and data signals encoded by the spectral encoding methods referenced above (e.g., 130 for sync signal, 132 for data signal). Specifically, a pre-filter is applied to increase the signal to noise ratio of the code signal. A Fourier Magnitude pre-filter is particular useful when used as a pre-process for the soft correlation described above. Filtering techniques are described in U.S. Pat. Nos. 6,614,914, 6,988,202 and 7,076,082, which are hereby incorporated by reference.

Additional pre-filtering, synchronization and weak signal decoding methods are also described in U.S. Pat. No. 6,122,403, which is hereby incorporated by reference.

Another improvement is to fold together (e.g., sum) successive blocks of the Fourier magnitude data to increase inaudible code signal to noise ratio (134, 136). Depending on how frequencies are selected to encode the synchronization and data components, this approach may require changes to the embedder so that frequencies that represent the same code data are accumulated over time (rather than causing destructive interference among different data elements).

A combination of filtering and folding of Fourier magnitude data, accumulated over time, improves robustness further. One embodiment of the decoder uses accumulation of the received data and/or moving average or exponential moving average filtering of the received data to improve signal to noise ratio of the inaudible code signal.

Encoder Improvements

Figure 2:
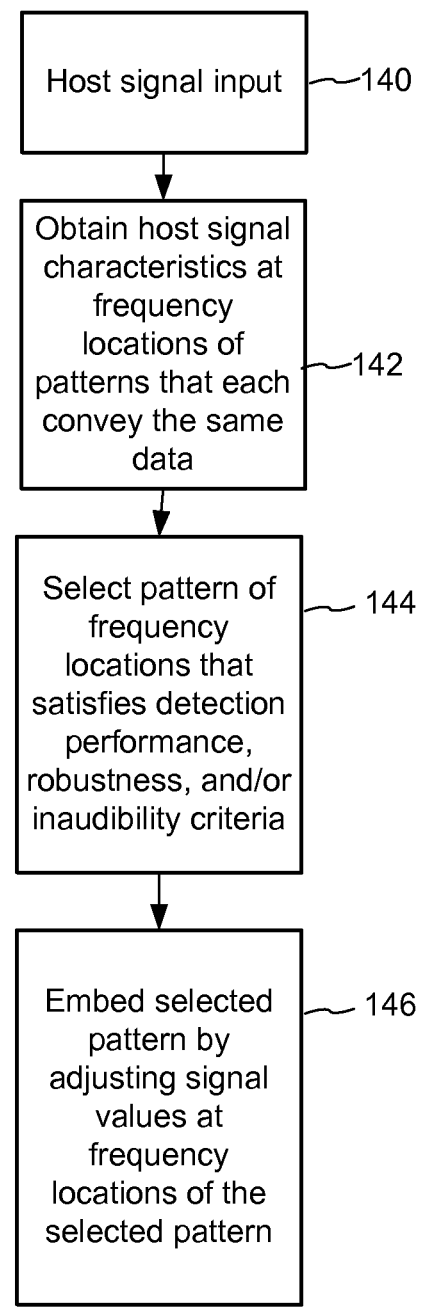
FIG. 2 is a diagram illustrating methods for embedding data in a media signal.

As summarized above, and shown in FIG. 2, one aspect of the invention comprises a method of embedding data in a media signal (140), wherein the data is embedded in the media signal by adjusting signal values at frequencies selected from among a set of frequency locations in predetermined frequency bands (146). The method comprises using signal characteristics of the media signal (142) to select a pattern of frequencies from among the set of frequency locations that satisfy a performance criteria for embedding data (144); and embedding the data at the selected pattern of frequencies by adjusting the signal values at the frequencies, wherein the selected pattern of frequencies varies according to the signal characteristics and the performance criteria (146).

The '361 publication describes a spectral encoding example in which the encoder selects frequency locations of the inaudible code signal from among 8 frequency locations in each of 5 frequency bands. An improved encoder uses "informed" encoding to select the code signal pattern from among some number of various other patterns which all convey the same data. The "informed" aspect of the encoding refers to the encoder's selection of the pattern that uses information about the host audio signal characteristics (142) to select the pattern that gives the best performance in terms of desired criteria, such as detection performance, robustness, and/or inaudibility of the selected pattern in the given audio data (144).

Another improvement that involves updates to the embedder are changes to the data encoding protocol to include error correction. More effective error correction coding than repetition coding should be included. One option is to use block codes. Examples of error correction include BCH and Reed Solomon encoding. Convolution and turbo codes may be used as well, along with Viterbi decoding of soft errors.

See, for example, U.S. Pat. No. 6,614,914, which is hereby incorporated by reference, which includes decoding and encoding enhancements, including pre-filtering, error correction, soft correlation, refinement stages in the detector, folding of received data to improve SNR of the embedded data, etc.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of decoding data embedded in a media signal, wherein the data is embedded in the media signal by adjusting signal values at frequencies, the method comprising:
   performing an initial approximation of time scale changes of the media signal using at least a portion of the embedded data in a first domain; wherein the initial approximation is performed in a log domain;
   based on the initial approximation of time scale changes, performing synchronization of the embedded data in a second domain, different from the first domain; and
   decoding at least a portion of the embedded data using the synchronization; wherein magnitude data at frequencies corresponding to the embedded data in the media signal is accumulated over time using a moving average, and the decoding is performed on the accumulated data.

2. The method of claim 1 wherein the initial approximation is performed in a pre-filtered magnitude frequency domain.

3. The method of claim 1 wherein the initial approximation includes performing a least squares method to approximate scale changes.

4. The method of claim 1 wherein the initial approximation includes performing a soft correlation between a pattern signal at selected frequencies and the media signal.

5. The method of claim 1 wherein detection information from at least the initial approximation is accumulated over plural blocks of the media signal, and subsequent detection of the embedded data is performed using the accumulated detection information.

6. The method of claim 1, wherein the magnitude data is accumulated using an exponential moving average.

7. A method of embedding data in a media signal, wherein the data is embedded in the media signal by adjusting signal values at frequencies selected from among a set of frequency locations in predetermined frequency bands, the method comprising:
   using signal characteristics of the media signal to select a pattern of frequencies from among different sets of patterns that convey the same data that satisfy a performance criteria for embedding the data; and
   embedding the data at the selected pattern of frequencies by adjusting the signal values at the frequencies, wherein the selected pattern of frequencies varies according to the signal characteristics and the performance criteria, wherein the performance criteria comprises detection performance of the embedded data and inaudibility of the embedded data of the selected pattern.

* * * * *